(12) United States Patent
Proctor, Jr.

(10) Patent No.: US 7,551,663 B1
(45) Date of Patent: Jun. 23, 2009

(54) USE OF CORRELATION COMBINATION TO ACHIEVE CHANNEL DETECTION

(75) Inventor: James A. Proctor, Jr., Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 922 days.

(21) Appl. No.: 10/119,522

(22) Filed: Apr. 9, 2002

Related U.S. Application Data

(63) Continuation-in-part of application No. 09/775,305, filed on Feb. 1, 2001.

(60) Provisional application No. 60/282,936, filed on Apr. 10, 2001.

(51) Int. Cl.
 *H04B 1/00* (2006.01)
(52) U.S. Cl. .................. 375/147; 375/150; 375/152; 375/130; 375/140
(58) Field of Classification Search ............ 375/130, 375/140, 147, 150, 152
See application file for complete search history.

(56) References Cited

U.S. PATENT DOCUMENTS

| | | | |
|---|---|---|---|
| 3,742,498 A | 6/1973 | Dunn | |
| 4,577,316 A | 3/1986 | Schiff | |
| 4,599,733 A * | 7/1986 | Gutleber | ............ 375/242 |
| 4,642,806 A | 2/1987 | Hewitt et al. | |
| 4,675,863 A | 6/1987 | Paneth et al. | |
| 4,817,089 A | 3/1989 | Paneth et al. | |
| 4,862,453 A | 8/1989 | West et al. | |
| 4,866,709 A | 9/1989 | West et al. | |
| 5,056,109 A | 10/1991 | Gilhousen et al. | |
| 5,103,459 A | 4/1992 | Gilhousen et al. | |
| 5,130,983 A | 7/1992 | Heffner, III | |
| 5,257,283 A | 10/1993 | Gilhousen et al. | |
| 5,267,262 A | 11/1993 | Wheatly, III | |

(Continued)

FOREIGN PATENT DOCUMENTS

EP 0 773 636 5/1997

(Continued)

OTHER PUBLICATIONS

Heine, Gunnar, "The Air-Interface of GSM," *GSM Networks: Protocols, Terminology and Implementation*, (MA: Artech House, Inc.), 1999, Chapter 7, pp. 89-100.

(Continued)

*Primary Examiner*—Jason M. Perilla
(74) *Attorney, Agent, or Firm*—Volpe and Koenig PC

(57) ABSTRACT

Combinations of correlation results are used to achieve detection of multiple coded signals at a receiver in a wireless communications system. The code applied to signals includes a lower rate code and a higher rate code. The lower rate code is a nested or tiered code such that it comprises at least two code sequences of the higher rate code. The received coded signal is correlated with the higher rate code using a single higher rate correlator to provide a higher rate code correlation result. The higher rate code correlation results are fed to two or more lower rate code correlators that combine multiple higher rate code correlation results, each using a different lower rate code, to provide corresponding lower rate code correlation results. The presence of at least one coded signal or mutually exclusive coded signals can be determined from the lower rate code correlation results.

38 Claims, 6 Drawing Sheets

U.S. PATENT DOCUMENTS

| | | | |
|---|---|---|---|
| 5,325,394 A * | 6/1994 | Bruckert | 375/148 |
| 5,339,316 A | 8/1994 | Diepstraten | |
| 5,422,887 A | 6/1995 | Diepstraten et al. | |
| 5,446,727 A | 8/1995 | Bruckert et al. | |
| 5,490,136 A | 2/1996 | Sereno et al. | |
| 5,537,397 A | 7/1996 | Abramson | |
| 5,586,119 A | 12/1996 | Scribano et al. | |
| 5,604,730 A | 2/1997 | Tiedemann, Jr. | |
| 5,652,764 A | 7/1997 | Kanzaki et al. | |
| 5,657,326 A | 8/1997 | Burns et al. | |
| 5,657,358 A | 8/1997 | Panech et al. | |
| 5,684,794 A | 11/1997 | Lopez et al. | |
| 5,689,502 A | 11/1997 | Scott | |
| 5,712,869 A * | 1/1998 | Lee et al. | 375/141 |
| 5,726,981 A | 3/1998 | Ylitervo et al. | |
| 5,745,484 A | 4/1998 | Scott | |
| 5,758,288 A | 5/1998 | Dunn et al. | |
| 5,802,046 A | 9/1998 | Scott | |
| 5,805,994 A | 9/1998 | Perreault et al. | |
| 5,828,662 A | 10/1998 | Jalali et al. | |
| 5,867,527 A | 2/1999 | Ziv et al. | |
| 5,892,774 A | 4/1999 | Zehavi et al. | |
| 5,893,035 A | 4/1999 | Chen | |
| 5,926,500 A * | 7/1999 | Odenwalder | 375/144 |
| 5,933,781 A | 8/1999 | Willenegger et al. | |
| 5,949,814 A * | 9/1999 | Odenwalder et al. | 375/140 |
| 5,959,980 A | 9/1999 | Scott | |
| 5,960,361 A | 9/1999 | Chen | |
| 5,982,760 A | 11/1999 | Chen | |
| 5,991,284 A | 11/1999 | Willenegger et al. | |
| 6,049,538 A | 4/2000 | Scott | |
| 6,058,338 A | 5/2000 | Agashe et al. | |
| 6,075,974 A | 6/2000 | Saints et al. | |
| 6,094,421 A | 7/2000 | Scott | |
| 6,094,576 A | 7/2000 | Hakkinen et al. | |
| 6,097,972 A | 8/2000 | Saints et al. | |
| 6,101,179 A | 8/2000 | Soliman | |
| 6,118,767 A | 9/2000 | Shen et al. | |
| 6,157,616 A | 12/2000 | Whitehead | |
| 6,188,678 B1 | 2/2001 | Prescott | |
| 6,188,903 B1 | 2/2001 | Gardner et al. | |
| 6,201,966 B1 | 3/2001 | Rinne et al. | |
| 6,208,871 B1 | 3/2001 | Hall et al. | |
| 6,212,220 B1 | 4/2001 | Proctor, Jr. et al. | |
| 6,222,873 B1 * | 4/2001 | Bang et al. | 375/146 |
| 6,246,673 B1 | 6/2001 | Tiedemann, Jr. et al. | |
| 6,246,715 B1 * | 6/2001 | Park et al. | 375/146 |
| 6,263,013 B1 | 7/2001 | Hendrickson | |
| 6,269,075 B1 | 7/2001 | Tran | |
| 6,269,088 B1 | 7/2001 | Masui et al. | |
| 6,272,354 B1 | 8/2001 | Saario | |
| 6,275,478 B1 | 8/2001 | Tiedemann, Jr. | |
| 6,301,291 B1 | 10/2001 | Rouphael et al. | |
| 6,332,008 B1 | 12/2001 | Giallorenzi et al. | |
| 6,353,645 B1 | 3/2002 | Solve et al. | |
| 6,388,997 B1 | 5/2002 | Scott | |
| 6,396,823 B1 | 5/2002 | Park et al. | |
| 6,452,913 B1 | 9/2002 | Proctor, Jr. | |
| 6,466,800 B1 | 10/2002 | Sydon et al. | |
| 6,483,816 B2 | 11/2002 | Tsunehara et al. | |
| 6,501,787 B1 * | 12/2002 | Odenwalder et al. | 375/147 |
| 6,512,751 B1 | 1/2003 | Struhsaker et al. | |
| 6,522,639 B1 | 2/2003 | Kitade et al. | |
| 6,532,226 B1 | 3/2003 | Lehtinent et al. | |
| 6,545,994 B2 | 4/2003 | Nelson, Jr. et al. | |
| 6,567,391 B1 | 5/2003 | Moon | |
| 6,570,865 B2 | 5/2003 | Masui et al. | |
| 6,574,211 B2 | 6/2003 | Padovani et al. | |
| 6,647,000 B1 | 11/2003 | Persson et al. | |
| 6,717,916 B1 | 4/2004 | Ahn et al. | |
| 6,724,740 B1 | 4/2004 | Choi et al. | |
| 6,735,188 B1 | 5/2004 | Becker et al. | |
| 6,804,219 B2 | 10/2004 | Koo et al. | |
| 6,807,221 B1 * | 10/2004 | Kim et al. | 375/140 |
| 6,934,319 B2 * | 8/2005 | Subramanian | 375/142 |
| 7,079,523 B2 * | 7/2006 | Nelson et al. | 370/342 |
| 2001/0030990 A1 | 10/2001 | Rouphael et al. | |
| 2001/0033558 A1 | 10/2001 | Matsuki | |
| 2001/0036200 A1 | 11/2001 | Nelson et al. | |
| 2002/0080024 A1 | 6/2002 | Nelson, Jr. et al. | |
| 2002/0141478 A1 * | 10/2002 | Ozluturk et al. | 375/130 |
| 2004/0047328 A1 | 3/2004 | Proctor et al. | |

FOREIGN PATENT DOCUMENTS

| | | |
|---|---|---|
| EP | 0 910 176 | 4/1999 |
| EP | 1 018 809 | 12/2000 |
| GB | 2 326 564 | 12/1998 |
| WO | 97/46041 | 4/1997 |
| WO | 99/14869 | 3/1999 |
| WO | 99/31811 | 6/1999 |
| WO | 99/52306 | 10/1999 |
| WO | 99/63682 | 12/1999 |

OTHER PUBLICATIONS

Ovesjö, Fredrik, "UTRA Physical Layer Description FDD Parts," European Telecommunication Standard, SMG2 UMTS Physical Layer Expert Group, XP002141421, v 0.4, Jun. 25, 1998, pp. 1-41.

Yang, Samuel C., "Principles of Code Division Multiple Access," In CDMA RF System Engineering, (MA: Artech House, Inc.), 1998, Chapter 4, pp. 75-103.

Heine, Gunnar, "The Air-Interface of GSM," *GSM Networks: Protocols, Terminology and Implementation*, (MA: Artech House, Inc.), 1999, Chapter 7, pp. 89-100.

Ovesjö, Fredrik, "UTRA Physical Layer Decription FDD Parts," European Telecommunication Standard, SMG2 UMTS Physical Layer Expert Group, XP002141421, v 0.4, Jun. 25, 1998, pp. 1-41.

Third Generation Partnership Project, "Technical Specification Group Radio Access Network; Physical Layer Procedures (FDD) (Release 1999)." 3GPP TS 25.214 v3.5.0 (Dec. 2000).

Third Generation Partnership Project, "Technical Specification Group Radio Access Network; Physical Layer Proceducres (FDD) (Release 1999)." 3GPP TS 25.214 v3.10.0 (Mar. 2002).

Third Generation Partnership Project, "Technical Specification Group Radio Access Network; Physical layer Procedures (FDD) (Release 1999)," 3GPP TS 25.224 V3.10.0 (Mar. 2002).

Third Generation Partnership Project, "Technical Specification Group Radio Access Network; Physical layer procedures (FDD) (Release 1999)," 3GPP TS 25.224 V3.5.0 (Dec. 2000).

Third Generation Partnership Project, "Technical Specification Group Radio Access Network; Spreading and modulation (TDD) (Release 1999)," 3GPP TS 25.223 V3.8.0 (Mar. 2002).

Third Generation Partnership Project, "Technical Specification Group Radio Access Network; Spreading and modulation (TDD) (Release 1999)," 3GPP TS 25.223 V3.4.0 (Sep. 2000).

Third Generation Partnership Project, "Technical Specification Group Radio Access Network; Physical Layer Procedures (FDD) (Release 4)." 3GPP TS 25.214 v.4.4.0 (Mar. 2002).

Third Generation Partnership Project, "Technical Specification Group Radio Access Network; Physical Layer Procedures (FDD) (Release 5)." 3GPP TS 25.214 v5.0.0 (Mar. 2002).

Third Generation Partnership Project, "Technical Specification Group Radio Access Network; Physical layer procedures (TDD) (Release 4)," 3GPP TS 25.224 V4.4.0 (Mar. 2002).

Third Generation Partnership Project, "Technical Specification Group Radio Access Network; Physical layer procedures (TDD) (Release 5)," 3GPP TS 25.224 V5.0.0 (Mar. 2002).

Third Generation Partnership Project, "Technical Specification Group Radio Access Network; Spreading and modulation (TDD) (Release 4)," 3GPP TS 25.223 V4.3.0 (Dec. 2001).

Third Generation Partnership Project, "Technical Specification Group Radio Access Network; Spreading and modulation (TDD) (Release 5)," 3GPP TS 25.223 V5.0.0 (Mar. 2002).

TIA/EIA Interim Standard, "Mobile Station-Base Station Compatibiltiy Standard for Dual-Mode Wideband Spread Spectrum Cellular System," TIA/EIA/IS-95-A (May 1995).

Yang, Samuel C., "Principles of Code Division Multiple Access," In CDMA RF System Engineering, (MA: Artech House, Inc.), 1998, Chapter 4, pp. 75-103.

* cited by examiner

USE OF CORRELATION COMBINATION TO ACHIEVE CHANNEL DETECTION

RELATED APPLICATIONS

This application claims the benefit of U.S. Provisional Application No. 60/282,936, filed on Apr. 10, 2001. This application is also a continuation-in-part of U.S. patent application Ser. No. 09/775,305 filed Feb. 1, 2001 entitled "Maintenance Link Using Active/Standby Request Channels." It is also related to U.S. patent application Ser. No. 09/738,934 filed Dec. 15, 2000 entitled "Reverse Link Correlation Filter In Wireless Communications Systems." The entire teachings of the above applications are incorporated herein by reference.

BACKGROUND

Code Division Multiple Access (CDMA) modulation is a multi-user access transmission scheme in which signals from different users overlap both in frequency and in time. This is in contrast with Frequency Division Multiple Access (FDMA) in which user signals overlap in time, but are assigned unique frequencies, and Time Division Multiple Access (TDMA) in which user signals overlap in frequency, but are assigned unique time slots. CDMA signaling is frequently used in cellular communication systems between a base station within a cell and a plurality of access units, e.g., wireless handsets, in the possession of users within the cell. The CDMA transmitted signal for each user that broadcasts from the user's access unit is spread over a wide bandwidth, which is greater than the initial user information bandwidth. Each user's signal is spread by a different spreading code to create a wideband spread. All of the spread wideband signals transmitted by the different users are received at the base station and form a composite received signal. The receiver at the base station distinguishes different users by using a local copy (or local reference) of the spreading code, which is available to both the access units and the base station in the CDMA system. Such a process is called channelization.

In an exemplary CDMA system according to the IS-95 standard, channels are defined for a reverse link, i.e., when an access unit is transmitting to a base station in the system, using a code called a pseudorandom noise (PN) code. The receiver at the base station detects the desired signal from a particular user out of the composite signal by correlating the composite signal with the original PN code. All other signals having codes that do not match the code for the desired user code are rejected by the correlator.

An exemplary CDMA reverse link includes a plurality of channels, e.g., access and traffic channels (or even more channel types depending on the design of the CDMA system). The traffic channel is used to transmit user data and voice, as well as signaling messages. The access channel is used on the reverse link to communicate control information to the base station. For example, when the access unit does not have a traffic channel assigned, the access channel is used to make call originations and to respond to pages and orders. The traffic channels are principally used to communicate voice or data payload information but are also used for other functions.

SUMMARY

In presently proposed so-called third generation (3 G) systems, multiple traffic channels may be assigned to each user, and the traffic channels may be encoded at different rates. This requires a receiver to configure a correlator for different data rates such that a single output is produced for a particular data rate. However, if multiple outputs and options are required, without a priori knowledge as to which channel is used, multiple codes must be searched, thus requiring multiple correlators. Such requirements contribute to the complexity and increase the cost of the receiver design.

There is a need for a wireless system with a flexible, simple receiver design. A wireless communications system is particularly needed that provides a single correlator in the receiver which can be used to receive multiple channels.

In general, the present invention relates to use of combinations of correlation results to achieve detection of multiple coded signals at a receiver in a wireless communications system. One aspect of the invention provides a method of detecting coded signals wherein the code applied to the signal includes a lower rate code and a higher rate code. The lower rate code is a nested or tiered code such that it comprises at least two repetitions or two sequences of the higher rate code. The received coded signal is correlated with the higher rate code using a single higher rate correlator to provide a higher rate code correlation result. The higher rate code correlation results are fed to two or more lower rate code correlators that combine multiple higher rate code correlation results, each using a different lower rate code, to provide corresponding lower rate code correlation results. The presence of at least one coded signal can be determined from the lower rate code correlation results.

In an embodiment that uses a first lower rate code and a second lower rate code, the presence of one or another of two mutually exclusive coded signals can be determined from the corresponding first and second lower rate code correlation results. In particular, the first and second lower rate code correlation results are compared with each other to determine the presence of either a first indication corresponding to the first lower rate code or a second indication corresponding to the second lower rate code. In one embodiment, one of the two indications corresponds to a request by an access unit to enter an active mode in order to communicate a data payload from the access unit to a base station in a wireless communications system. The other indication corresponds to a notification by the access unit to the base station that the access unit desires to remain in a standby mode.

According to another aspect of the invention, N lower rate codes are used in the detection to provide M lower rate code correlation results. The presence of at least one coded signal can be determined from the N lower rate code correlation results. The N lower rate codes can be selected from a set of M possible codes based on a priori system information. The system information can be used to limit the hypothesis outcomes, if any are known, such as the mutual exclusivity of the presence of coded signals. In one embodiment, the set of M possible codes may represent data or instructions relating to a set of nearby base stations that are candidates for possible cell handoff and N may represent the subset of the M nearby base stations that are identified as actual active candidates based on system criteria such as signal strength or signal-to-noise figure.

The lower rate codes are preferably orthogonal to each other and can be Walsh codes, Gutleber codes, maximum length (M)-sequences, or PN-sequences.

According to another aspect of the invention, detection of the received coded signal is provided independent of the correlation method that is used. In particular, for a code applied to the signal that includes a nested code, the nested code being one of a set of M possible nested codes, the detection method comprises correlating the received coded signal to provide N nested code correlation results and determining the presence of at least one coded signal from the N nested code correlation results.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
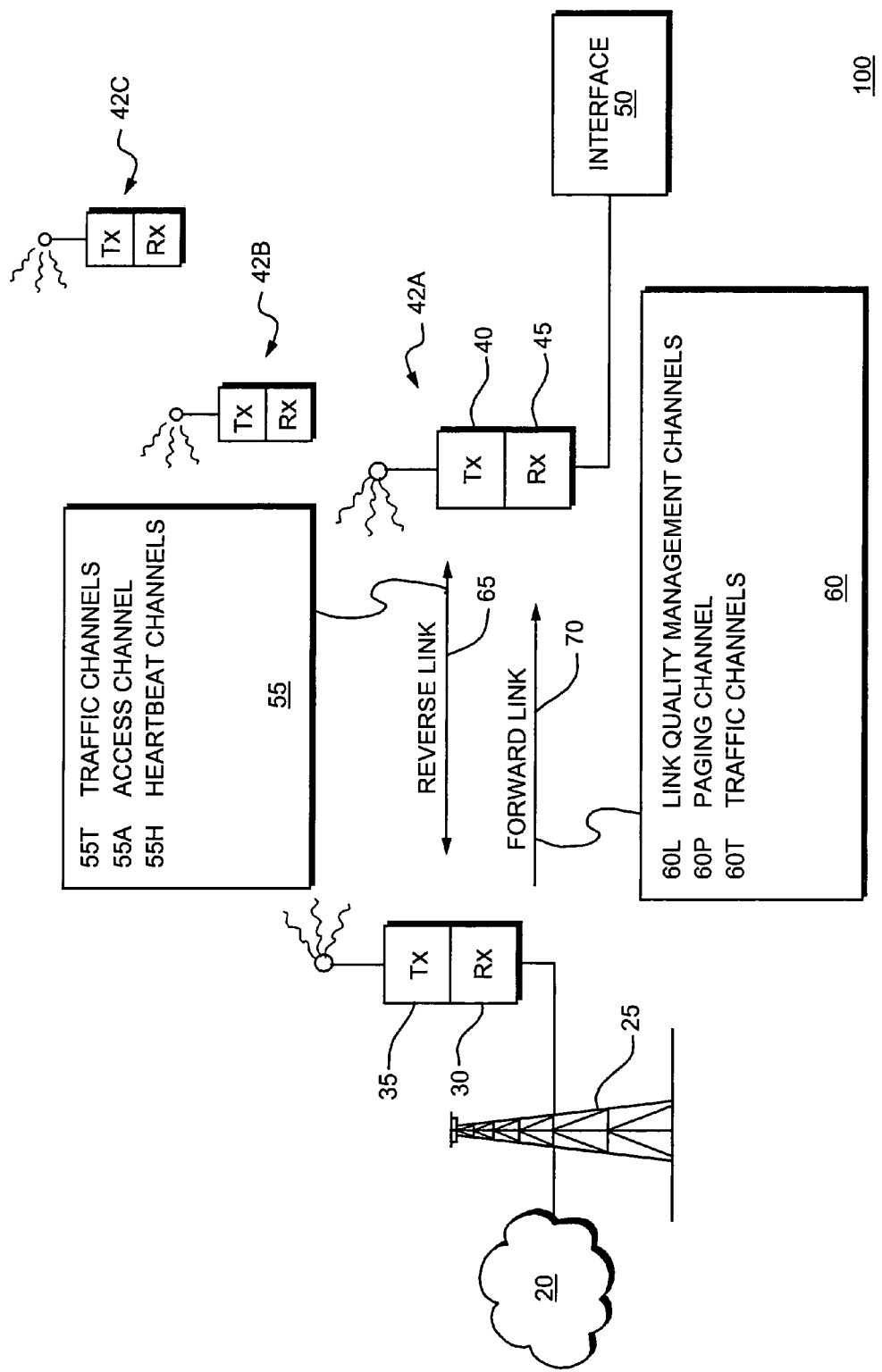
FIG. 1 is a general diagram illustrating a wireless communication system.

FIG. 1 is a diagram of a wireless communications system 100 according to the principles of the present invention. A base station 25 maintains wireless communication links with a plurality of access units 42A, 42B, 42C (collectively, access units 42) as shown. Such wireless links are established based upon assignment of resources on a forward link 70 and a reverse link 65 between the base station 25 and access units 42. Each link 65 or 70 is typically made up of several logical channels 55 or 60.

The system 100 supports communications between interface 50 and network 20. Network 20 is typically a Public Switched Telephone Network (PSTN) or computer network such as the Internet. Interface 50 is preferably coupled to a digital processing device such as a portable computer (not shown), to provide wireless access to network 20.

In an illustrative embodiment, the forward link channels 60 and reverse link channels 55 are defined in the wireless communications system 100 as Code Division Multiple Access (CDMA) channels. That is, each CDMA channel is preferably defined by encoding data to be transmitted over the channel with a channel code. The channel coded data is then modulated onto a radio frequency carrier. This enables a receiver to decipher one CDMA channel from another knowing only the particular channel code assigned to that channel.

The forward link channels 60 include at least three logical channel types. Included among these are a Link Quality Management (LQM) channel 60L, a paging channel 60P, and multiple traffic channels 60T.

The reverse link 65 includes heartbeat channels 55H, an access channel 55A and multiple traffic channels 55T. Generally, the reverse link channels 55 are similar to the forward link channels 60 except that each reverse link traffic channel 55T may support variable data rates from 2.4 kbps to a maximum of 160 kbps.

Data transmitted between base station 25 and an access unit 42 typically consists of encoded digital information, such as hypertext transfer protocol (HTTP) encoded Web page data. Based on the allocation of traffic channels in the reverse link 65 or forward link 70, data transfer rates are generally limited by the number of available traffic channels 55T, 60T.

Figure 2:
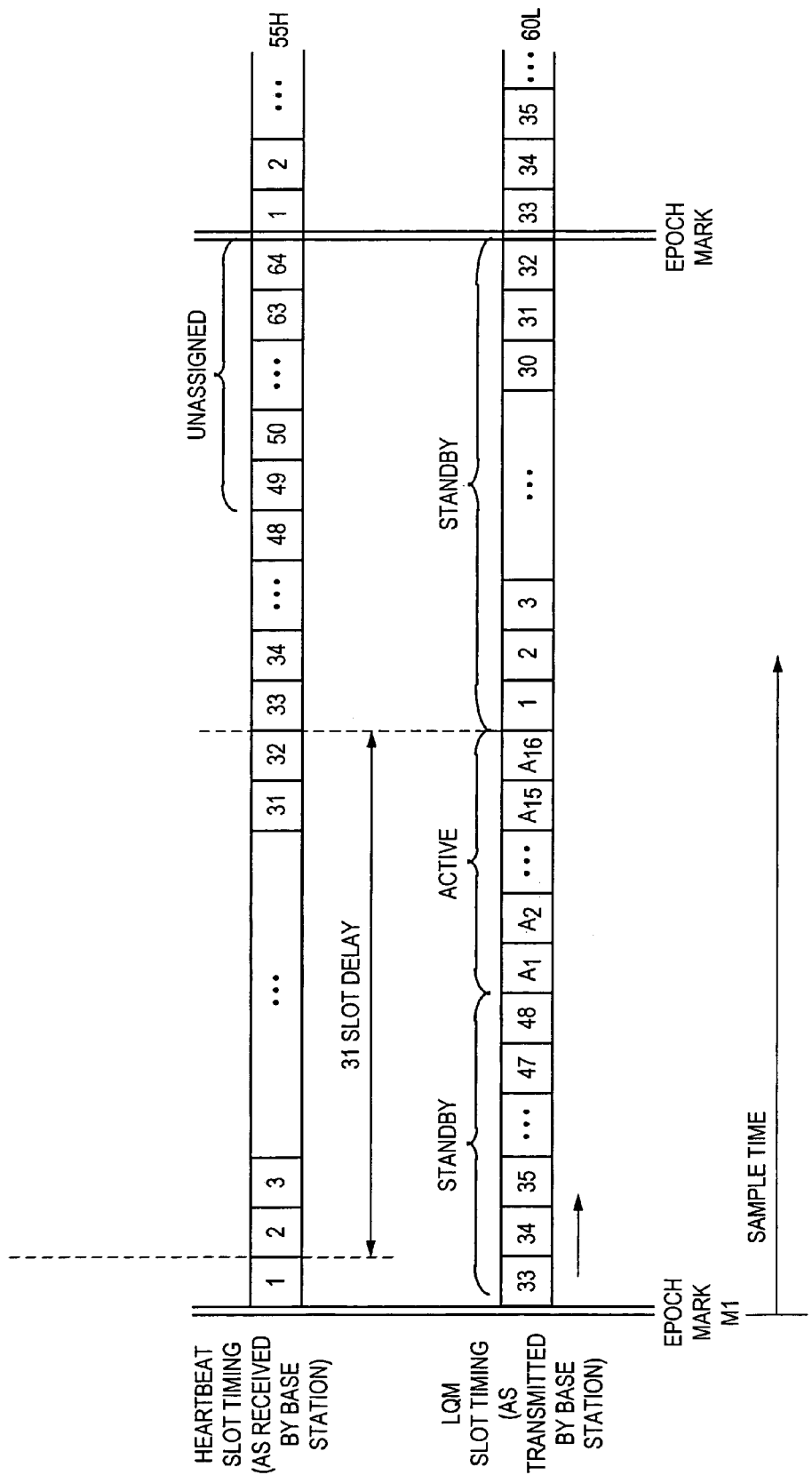
FIG. 2 is a timing diagram illustrating heartbeat slot and link quality management (LQM) slot timing.

As shown in FIG. 2, the forward link LQM channel 60L is partitioned into a predetermined number of periodically repeating time slots for the transmission of messages to each of multiple access units 42. Each access unit 42A identifies messages directed to itself based upon messages received in an assigned time slot.

The reverse link heartbeat channel 55H is shared among multiple users. For example, the heartbeat channel 55H is also partitioned into periodically repeating time slots. Each time slot is assigned to one of many access units 42 for transmitting heartbeat messages to the base station 25. Accordingly, the base station 25 identifies from which access unit 42A a message is transmitted based upon the receipt of a message in a particular time slot. The heartbeat channel 55H and the LQM channel 60L are described in more detail below.

In the following description, reference is again generally made to FIG. 1, but more specific details of LQM channel 60 and heartbeat channel 55H are referenced to FIG. 2.

Generally, to establish a synchronized link with the base station 25, access units 42 transmit link request messages on the access channel 55A to base station receiver 35 via access unit transmitter 40. Messages are then acknowledged and processed at the base station 25. If available, resources are then allocated at the base station 25 to establish a bidirectional communication link with the requesting access unit 42A.

Within the forward link 70, the paging channel 60P is used by the base station transmitter 30 to send overhead and paging messages or commands to the access unit receiver 45. Overhead information includes data such as system configuration parameters for establishing wireless links with access units 42.

As mentioned previously, wireless communication system 100 includes a heartbeat channel 55H in the reverse link 65 and link quality management channel (LQM) 60L in the forward link 70. These channels are shared between the base station 25 and multiple access units 42. That is, the base station 25 transmits messages to multiple access units 42 using the same forward link LQM channel 60L, where a message to a particular access unit 42A is transmitted in an assigned time slot. In this way, time slot assignments serve as a way of addressing messages to a particular access unit and corresponding communication link.

The present system can support users that require on-demand, sporadic high speed throughput. For example, remote users connected to the Internet over a wireless link typically require high speed throughput when downloading an object file such as a Web page. Such users then typically do not require any data transfer for a period of time. To support such users, it is advantageous to maintain synchronization with the base station for future on-demand data transfers. This is achieved in the wireless communication system 100 by maintaining a minimal connection with the base station 25 even when no data is being actively transferred between the base station 25 and a specific access unit 42.

Repeatedly creating or reviving connections for users who sporadically need a link can be time consuming and an inefficient use of resources. It is also inefficient to reserve resources such as traffic channels 55T for subscribers who are not transmitting data. Accordingly, traffic channels 55T are allocated on an as-needed basis to support data transfers, optimizing the use of available resources in wireless communication system 100.

FIG. 2 is a timing diagram for the heartbeat channel 55H and LQM channel 60L. Preferably, there are two LQM channels 60L and two heartbeat channels 55H since channels are typically allocated in pairs. However, only one of each channel type is shown in FIG. 2 for illustrative purposes.

As shown, 64 time slots (in each direction) are defined per EPOCH period in each of the heartbeat 55H and LQM 60L channels. The EPOCH period in the illustrated embodiment is 13.3 mS, so that each time slot is 208 mS or 256 code chips where a chip is a unit of time that corresponds to the output interval of the spreading code. Because time slots repeat on a periodic basis, base station 25 exchanges information with a particular access unit 42A every EPOCH or 13.3 mS.

Data transmissions on the LQM channel 60L are maintained by the base station 25, which is preferably used as a master timing reference. That is, timing of the access units 42 is aligned with base station 25. Access units 42, therefore, must synchronize themselves to the base station 25, and specifically to the LQM channel 60L, in order to maintain synchronization with the base station 25.

Generally, a link between the base station 25 and an access unit 42A is maintained in one of three modes: active, standby or idle. Synchronization between base station 25 and a particular access unit 42A is maintained only for the active and standby mode.

While in the active mode, synchronization of the forward and reverse link is maintained between the LQM channel 60L and traffic channels 55T since the heartbeat channel time slot is no longer dedicated on the reverse link 65 to the access unit 42A.

Each access unit 42A in the standby mode is assigned one time slot in the forward link LQM channel 60L and one time slot in the reverse link heartbeat channels 55H. Accordingly, information is targeted to a receiving access unit 42A (subscriber) based upon the transmission of a message in a particular time slot. For example, an access unit 42A assigned to time slot #1 decodes information received in time slot #1 on the forward link LQM channel 60L, while data is transmitted back to the base station 25 from access unit 42A in time slot #1 of the reverse link heartbeat channel 55H. Both base station 25 and access unit 42A identify to which link a message pertains based on receipt of a message in a particular time slot. It should be noted that although the LQM channel 60L is used as the time reference as described above, the principles of the present invention equally apply where the heartbeat channel 55H is alternatively used as a master timing reference rather than the LQM channel 60L. In other words, base station 25 is optionally synchronized with respect to an access unit 42A.

In the standby mode, synchronization is maintained between the forward link LQM channel 60L and reverse link heartbeat channel 55H based upon messages sent in the appropriate time slot on the LQM channel 60L indicating to a particular access unit 42A whether messages transmitted to the base station 25 from that access unit are received in the appropriate time slot. Message transmissions from the access unit transmitter 40 to base station 25 on the heartbeat channel 55H are analyzed at base station receiver 35 to achieve fine tuning alignment between base station 25 and each of multiple access units 42.

As shown in FIG. 2, time slots $A_1$ through $A_{16}$ of the LQM channel 60L are reserved for access units 42 in the active mode, indicating that data is being transferred between the access unit 42A and the base station 25. Contrariwise, time slots numbered 1-48 are reserved for access units 42 operating in the standby mode on the LQM channels 60L.

At any given time, there are typically no more than 48 time slots in the heartbeat channel 55H or LQM channel 60L assigned to respective access units 42. This ensures that on completion of a data transfer between an access unit 42A and base station 25, an access unit 42A in the active mode assigned an active time slot can revert back to the standby mode and consequently be assigned an unused standby mode time slot 1-48 in the LQM channel 60L again.

The details relating to use of the LQM channel 60L and heartbeat channels 55H for synchronization and timing alignment are disclosed in the above-mentioned U.S. patent application Ser. No. 09/775,305.

A set of channel codes are used at the access units 42, one code of which is generally to be transmitted in the assigned time slot in the reverse link heartbeat channel 55H. The transmission of this code is used as a signal received by the base station 25 to retain synchronization with the access unit 42A while in a "standby" mode. Each code however, may also correspond to a particular command or request. For example, one code is used to notify the base station that the access unit 42A is ready to begin transmitting a data payload to the base station, i.e., an access unit requests to go into an "active" transmission mode. This is referred to herein as a "heartbeat with request" signal. Another code is used to notify the base station that the access unit desires to remain in standby mode. This is referred to herein as a "heartbeat" signal.

The wireless system according to the invention provides three tiers of data rates, i.e., tier 1, tier 2, and tier 3, for use by the CDMA channels. At tier 1, a transmitter transmits 8 chips per symbol to a receiver. At tier 2, the transmitter transmits 32 chips per symbol to the receiver. At tier 3, the transmitter transmits 128 chips per symbol.

Figure 3:
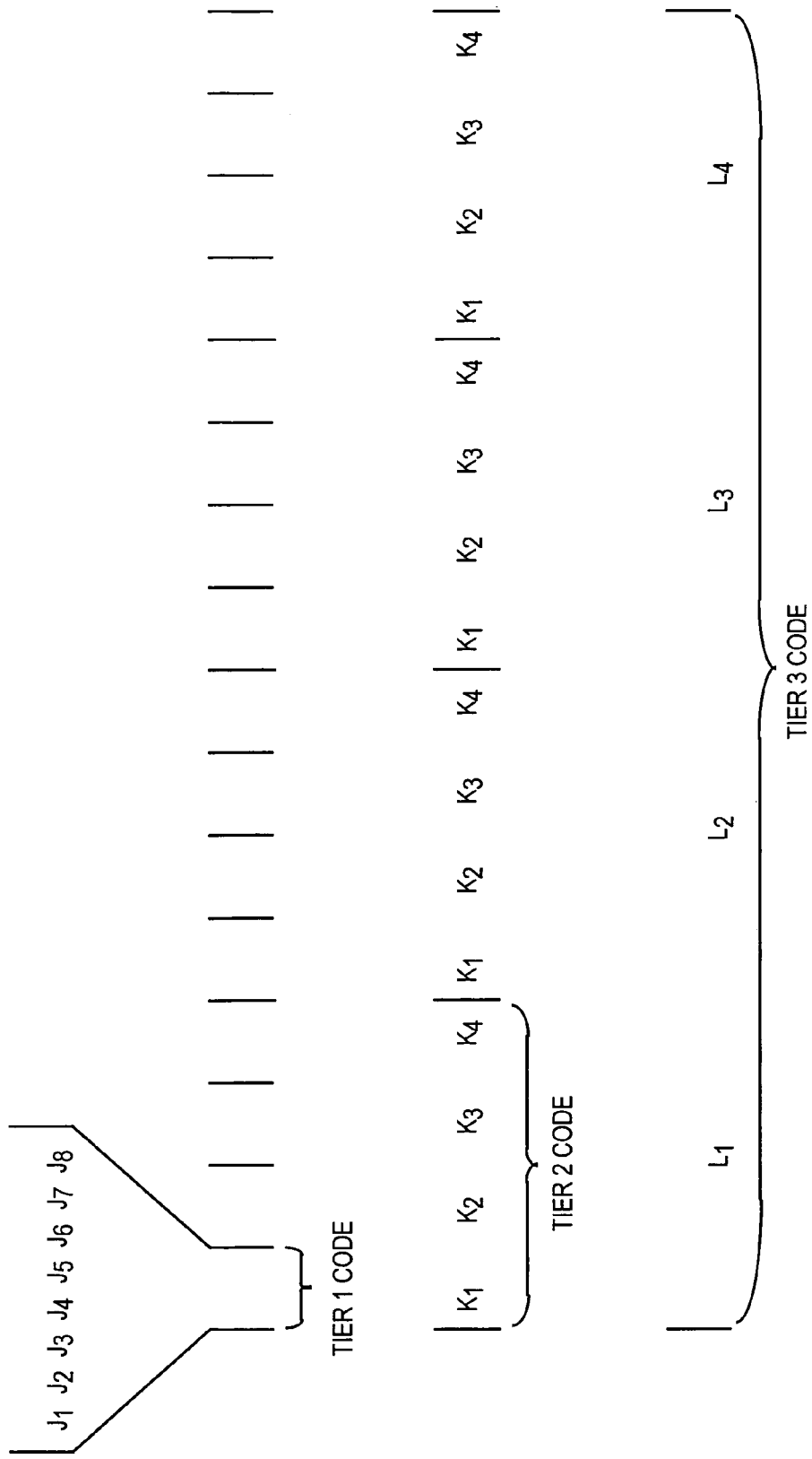
FIG. 3 is a diagram illustrating the relationship among tier 1, tier 2 and tier 3 code sequences.

FIG. 3 shows the relationship between tiers 1, 2 and 3 in more detail. In particular, what is shown is a nesting of the codes. A tier 1 code comprises an 8 chip sequence $J_1$ through $J_8$. The tier 2 code comprises 4 code elements, $K_1$ through $K_4$. Each of the code elements $K_1$ through $K_4$ is composed of, is aligned with, and has a duration equal to, a tier 1 code sequence $J_1$ through $J_8$. That is, the code boundary of the tier 1 code coincides with each of the tier 2 code elements $K_1$ through $K_4$. Thus, the tier 2 code repeats every 32 chips. Likewise, the tier 3 code comprises code elements, $L_1$ through $L_4$. Each code element of the tier 3 code is composed of, is aligned with a corresponding tier 2 code sequence, $K_1$ through $K_4$. Thus, the tier 3 code sequence, $L_1$ through $L_4$, has a duration of 128 chips.

Figure 4:
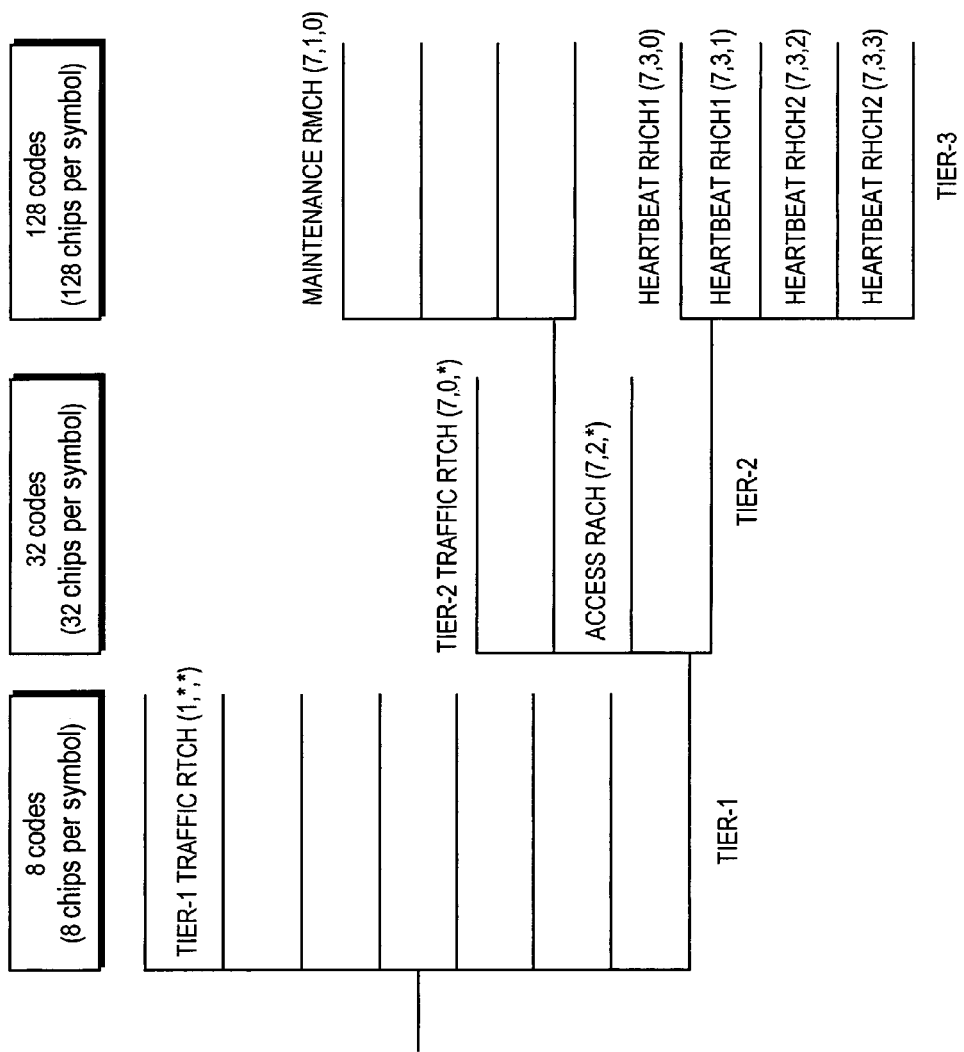
FIG. 4 is a diagram illustrating a selected set of codes in a tiered code structure.

In the preferred embodiment, the difference between the channel code assigned to the heartbeat signal versus the heartbeat with request signal is the specific tier 3 code that is applied. That is, the channel codes assigned to the heartbeat and heartbeat with request signals are selected such that the tier 1 and tier 2 codes are the same for each signal. The difference is only in the tier 3 code sequence that nests the tier 1 and tier 2 codes. The nesting of the tier 1 and tier 2 codes with respect to the tier 3 codes for the heartbeat and heartbeat with request signals is illustrated in FIG. 4, which shows a tree structure for the tiered codes. In particular, four codes that are assigned to heartbeat and heartbeat with request signals are indicated as individual branches connected to a common tier 2 branch that is in turn connected to a particular tier 1 branch. Other branches are shown to indicate channel code assignments for other channels, e.g., traffic, maintenance and access channels. The notation (X, Y, Z) is used to indicate the branches assigned at each tier to the particular code. Thus, one code (7,3,0) is reserved for the heartbeat signal while another code (7,3,1) is reserved for the heartbeat with request signal. Another optional heartbeat signaling pair uses codes (7,3,2) and (7,3,3). Note that other channels (e.g., traffic, access and maintenance) can be assigned other unique codes, as shown in the tree structure.

The tier 3 codes are preferably orthogonal to each other. The orthogonal codes can be Walsh codes or Gutleber codes or other code such as maximal length (M)-sequences or PN-sequences. It should be noted that while a three-level or three-tiered code is used in the preferred embodiment, other embodiments can use two tiers. For example, a 64 chip tier 1 code nested in a four element tier 2 code, that is, 256 chips in length could be used. Another two-tiered code includes a 16 chip tier 1 code nested in an eight element tier 2 code, that is, 128 chips in length.

Figure 5:
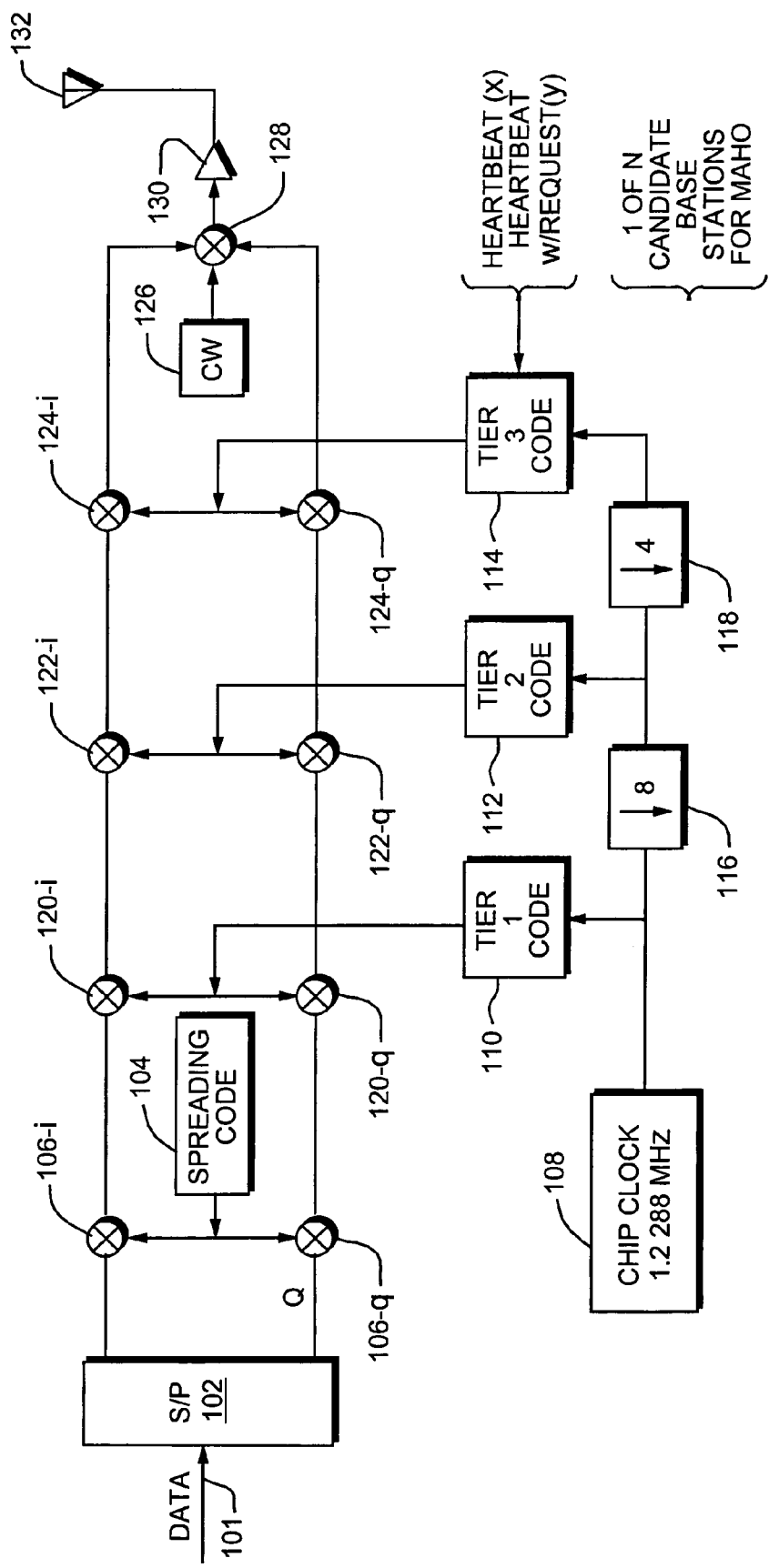
FIG. 5 is a block diagram of channel encoding at a transmitter in the system of FIG. 1.

Turning attention now to FIG. 5, the channel encoding process for transmission of heartbeat and heartbeat with request signals on the heartbeat channel 55H of the reverse link 65 from a transmitter 40 at access unit 42A is described. Specifically, the channel encoding process takes an input data signal 101 that represents information to be transmitted. In the case of a heartbeat or heartbeat with request signal, the data has a value of 1 for the duration of the time slot, i.e., 256 code chips. A serial to parallel converter 102 provides an in-phase (i) and quadrature (q) signal path to a pair of multipliers 106-i and 106-q. A spreading code generator 104 provides a spreading code used for spectrum spreading purposes. Typically, the spreading code is a short pseudorandom noise code.

A second code modulation step is applied to the (i) and (q) signal paths by multiplying the two signal paths with a tier 1 code. This is accomplished by the tier 1 code generator 110 and code multipliers 120-1 and 120-q.

A third step in the encoding process is to apply a tier 2 code as generated by tier 2 code generator 112. This is accomplished by the multipliers 122-i and 122-q impressing the tier 2 code on each of the in-phase and quadrature signal paths.

In a fourth and final step of the encoding process, a tier 3 code is applied to the (i) and (q) signal paths. This is accomplished by the tier 3 code generator 114 and the code multipliers 124-i and 124-q. As noted previously, the tier 3 code (x) for sending the heartbeat signal is selected to be different from the tier 3 (y) code selected for sending the heartbeat with request signal.

The tier 3 encoded in-phase and quadrature signal paths modulate a carrier wave as generated by carrier wave source 126 using an RF modulator 128. The modulated signal is amplified through amplifier 130 and transmitted via antenna 132.

A chip clock 108 provides chip clock timing at the rate of 1.2288 MHz to the tier 1, tier 2, and tier 3 generators 110, 112 and 114. As noted previously, the tier 1 code is at a rate of 8 chips per symbol. The chip clock is divided down by a factor of 8 using divider 116. The tier 2 code generator operates at 32 chips per symbol. The chip clock is divided again by a factor of 4 by divider 118 for the tier 3 generator 114 which provides 128 chips per symbol.

Figure 6:
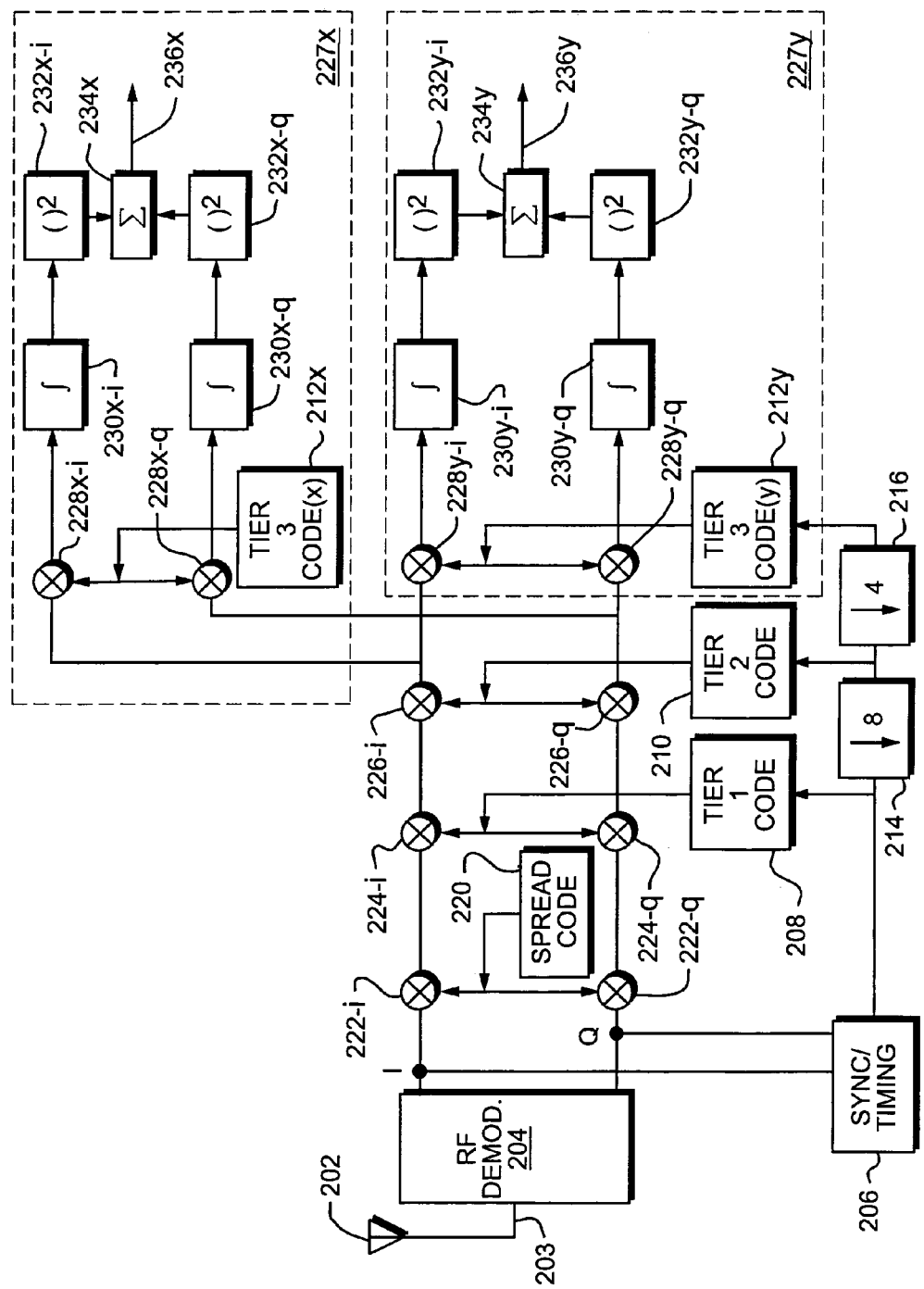
FIG. 6 is a block diagram of channel correlation at a receiver according to the principles of the present invention.

FIG. 6 is a block diagram that illustrates channel correlation at a receiver 35 of base station 25 (FIG. 1) in accordance with principles of the present invention. In general, the correlation process takes advantage of the structure of the tiered or nested codes used to represent coded signals, for example the heartbeat and heartbeat with request signals in the present system. In particular, the correlation process uses the output of a higher rate correlator to feed two or more lower rate correlators, as described further below. Therefore, the higher rate correlator structure can be shared to achieve detection of multiple coded signals.

The channel correlation process includes a number of codes as generated by spreading code generator 220, tier 1 code generator 208 and tier 2 code generator 210. In addition, to detect separate coded signals that are coded at the tier 3 code rate, corresponding separate codes are generated by tier 3 code generators 212x and 212y, respectively.

As shown in FIG. 6, a signal 203 received by antenna 202 is fed into RF demodulator 204 where the signal is demultiplexed to provide in-phase (i) and quadrature (q) signal paths to a first pair of multipliers 222-i and 222-q. Spreading code generator 220 provides a spreading code used for despreading purposes. This spreading code is the same as the spreading code used in the encoding process with spreading code generator 104 (FIG. 5).

A second step in the correlation process is to apply the tier 1 code as generated by tier 1 code generator 208. This is accomplished by the multipliers 224-i and 224-q impressing the tier 1 code on each of the in-phase and quadrature signal paths.

In a third step of the correlation process, the tier 2 code as generated by the tier 2 code generator 210 is applied to each of the in-phase and quadrature signal paths by multipliers 226-i and 226-q.

In the final step of the correlation process, a particular tier 3 code as generated by the respective tier 3 code generators 212x and 212y is applied to each of the in-phase and quadrature signal paths.

As shown in FIG. 6, there are two correlation legs 227x and 227y that share the tier 2 correlation results. In the illustrated embodiment, where 2 possible codes could have been sent (x for heartbeat and y for heartbeat with request), there are two tier 3 correlators. The tier 3 codes are applied by respective multipliers 228x-i, 228x-q and 228y-i, 228y-q. Each correlation leg 227x and 227y includes integrators 230x-i, 230x-q and 230y-i, 230y-q. In addition, in the in-phase and quadrature signal paths of each leg 227x and 227y are included squarers 232x-i, 232x-q and 232y-i, 232y-q. The outputs of the value squarers are summed in summers 234x and 234y respectively to provide final correlation outputs 236x and 236y, respectively.

As configured, the integrators 230 integrate over 128 chips. In other embodiments, the integration can be distributed at each tier stage rather than at the final tier 3 stage as shown in FIG. 6.

The correlation in FIG. 6 can be viewed as a series of correlations at the succeeding tiered code rates. That is, the received coded signal is correlated with the higher rate code (tier 2) using a single higher rate correlator (tier 2 code generator 210, multipliers 226-i, 226-q) to provide a higher rate code correlation result. In a sense, the higher rate code correlation result is a sub-correlation that corresponds to a code element of the lower rate code. The higher rate code correlation results are then fed to two or more lower rate code correlators (correlation legs 227x, 227y) that combine multiple higher rate code correlation results, each using a different lower rate code (tier 3 code generators 212x, 212y), to provide corresponding lower rate code correlation results (236x, 236y). The presence of at least one coded signal can be determined from the lower rate code correlation results. Thus, the dual outputs 236x, 236y are generated in part from the same sub-correlations or higher rate code correlation results.

In particular, the presence of one or another of two mutually exclusive coded signals can be determined from the lower rate code correlation results. For example, the lower rate code correlation results 236x, 236y can be compared with each other to determine the presence of either heartbeat (code x was sent) or heartbeat with request (code y was sent) signals.

It should be understood that while two correlation legs 227x and 227y are shown in FIG. 6, it is possible to have multiple such correlation legs to use combinations of correlation results to achieve detection of multiple coded signals.

For example, there can be a set of M tier 3 codes with a known subset of N selected codes to be used in communicating coded signals. In that case, the correlator structure can be expanded to have N different correlation legs 227, each one having a different tier 3 code generator 212 corresponding to the N selected codes.

Accordingly, the N lower rate codes can be used in the detection to provide M lower rate code correlation results. That is, in general, the presence of at least one coded signal can be determined from the N lower rate code correlation results. The N lower rate codes can be selected from a set of M possible codes based on a priori system information. The system information can be used to limit the hypothesis outcomes, if any are known, such as the mutual exclusivity of the presence of coded signals.

In one embodiment, the set of M possible codes may represent a set of nearby base stations that are candidates for possible cell handoff of one or more of the code channels and N may represent the subset of the M nearby base stations that are identified as actual active or preferred candidates based on system criteria such as signal strength or signal-to-noise figure.

For example, consider the process of hand over in a cellular communication system, where a mobile access unit is moving from an area serviced by one cell site to another. To avoid disruption of communications (e.g., dropping a call) while the access unit crosses a cell boundary, the timing of handing over control to a new base station must be carefully orchestrated. In a process known as Mobile Assisted Hand Over (MAHO) the mobile access unit performs certain calculations to determine when to communicate to both the current serving base station and a new serving base station that hand over is imminent. For CDMA based systems that employ soft hand-off of the reverse link, this may be transmitted to both base stations simultaneously, but it is not required.

In this process, each access unit maintains a list of candidate base stations in its general vicinity. This can be done, for example, by detecting the presence of forward link paging channels 60P or pilot channels from various base stations 25 in the vicinity (FIG. 1). At any given time, this candidate list will consist of N of M possible base stations in the system 100. The access unit periodically sends the candidate to each base station that it "sees," such as on a reverse link traffic channel 55T. However, precise timing of an actual need for hand over (such as when the paging channel 60P or pilot channel from a currently serving base station is diminishing in power) is critical. Accordingly, the access unit can use the invention by simply sending a short burst with one of N possible tier 3 codes. Thus, because the base station has the candidate list of N preferred base stations available, it can utilize N tier 3 correlators 227 with the N expected codes, and determine which one was sent. In this way, hand over control information can be rapidly and efficiently communicated for selecting service.

The embodiment illustrated in FIG. 6 shows sharing of the output of a higher rate (i.e., tier 2) correlator with two or more lower rate (i.e., tier 3) correlators. It should be understood, however, that in other embodiments the output of the tier 1 correlator can be shared with two or more tier 1 correlators that in turn are shared with two or more tier 3 correlators depending on the types of nested codes used in the wireless communications system.

The correlation process described above with respect to FIG. 6 can be time multiplexed among different access units 42 (FIG. 1) that share the heartbeat channels 55H, thereby allowing a single correlator structure to be shared.

The tier 1, 2, and 3 codes are shown in FIGS. 5 and 6 as operations using Walsh codes. It should be understood that other orthogonal codes such as Gutleber codes could be used as well as M-sequences or pseudo orthogonal codes.

It should also be understood that detection of the received coded signal can be provided independent of the correlation method that is used where there is a priori system knowledge available. In particular, for a code applied to the signal that includes a nested code, the nested code being one of a set of M possible nested codes, detection can be achieved by correlating the received coded signal to provide N nested code correlation results and determining the presence of at least one coded signal from the N nested code correlation results using the system knowledge to limit outcomes. The specific N nested codes can change over time, with information indicating the changes in the current set of codes being communicated between base station and access units to provide a priori system information that is current.

While the specific embodiments described herein relate to operation on a reverse link, it should be understood that the principles of the present invention are also applicable to embodiments that detect coded signals on a forward link.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of detecting a received coded signal in a receiver wherein the code applied to the received coded signal includes a lower rate code comprising at least two code sequences of a higher rate code, the method comprising:
    correlating the received coded signal at the receiver with the higher rate code to provide a higher rate code correlation result;
    correlating the higher rate code correlation results with a first lower rate code to provide a first lower rate code correlation result;
    correlating the higher rate code correlation results with a second lower rate code to provide a second lower rate code correlation result; and
    comparing the first lower rate code correlation result to the second lower rate code correlation result to determine the presence of a signal indication.

2. The method of claim 1, further comprising determining the presence of a first indication corresponding to the first lower rate code from the first lower rate code correlation result.

3. The method of claim 1 further comprising determining the presence of a second indication corresponding to the second lower rate code form the second lower rate code correlation result.

4. The method of claim 1 further comprising determining the presence of one or another of two mutually exclusive signal indications form the first and second lower rate code correlation results.

5. The method of claim 1 wherein the received coded signal is received periodically.

6. The method of claim 1 wherein the lower rate codes are orthogonal to each other.

7. The method of claim 1 wherein the lower rate codes are Walsh codes.

8. The method of claim 1 wherein the lower rate codes are Gutleber codes.

9. The method of claim 1 wherein the lower rate codes are maximum length sequences.

10. The method of claim 1 wherein the lower rate codes are PN-sequences.

11. The method of claim 1 wherein the higher rate code is 32 chips in length and the lower rate codes are 128 chips in length.

12. The method of claim 1 wherein the lower rate codes are used for timing signals.

13. A method of detecting a received coded signal in a receiver wherein a code applied to the received coded signal includes a lower rate code comprising at least two code sequences of a higher rate code, the method comprising:
- demodulating the received coded signal at the receiver into in-phase and quadrature components;
- correlating the in-phase and quadrature components with the higher rate code to provide higher rate code correlation results;
- correlating higher rate code correlation results with a first lower rate code to provide a first lower rate code correlation result;
- correlating higher rate code correlation results with a second lower rate code to provide a second lower rate code correlation result; and
- comparing the first lower rate correlation result to the second lower rate code correlation result to determine the presence of a signal indication.

14. The method of claim 13 wherein the lower rate codes belong to a set of M possible lower rate codes, and the steps of correlating the higher rate code correlation results are based on N of the set of M lower rate codes to provide N lower rate code correlation results where N is less than M.

15. The method of claim 14 further comprising determining the presence of at least signal indication from the N lower rate code correlation results.

16. The method of claim 14 further comprising determining the presence of mutually exclusive signal indications from the N lower rate code correlation results.

17. The method of claim 14 further comprising determining the presence of N mutually exclusive signal indications from the N lower rate code correlation results.

18. The method of claim 14 further comprising determining the presence of a subset of N mutually exclusive signal indications from the N lower rate code correlation results.

19. The method of claim 14 wherein the N lower rate codes are selected based on a priori system information.

20. The method of claim 14 wherein the received coded signal is received periodically.

21. The method of claim 14 wherein the lower rate codes are orthogonal to each other.

22. The method of claim 14 wherein the lower rate codes are Walsh codes.

23. The method of claim 14 wherein the lower rate codes are Gutleber codes.

24. The method of claim 14 wherein the lower rate codes are maximum length sequences.

25. The method of claim 14 wherein the lower rate codes are PN-sequences.

26. The method as in claim 13 wherein the lower codes are nested codes comprising at least two code sequences of a base code and N nested lower rate codes are selected from of a set of M possible nested codes.

27. The method of claim 26 further comprising determining the presence of mutually exclusive signal indications from the N lower rate code correlation results.

28. The method of claim 26 further comprising determining the presence of N mutually exclusive signal indications from the N lower rate code correlation results.

29. The method of claim 26 further comprising determining the presence of a subset of N mutually exclusive signal indications from the N lower rate code correlations results.

30. The method of claim 26 wherein the N nested codes are selected based on a priori system information.

31. The method of claim 26 wherein the received coded signal is received periodically.

32. The method of claim 26 wherein the nested codes are orthogonal to each other.

33. The method of claim 26 wherein the nested codes are Walsh codes.

34. The method of claim 26 wherein the nested codes are Gutleber codes.

35. The method of claim 26 wherein the nested codes are maximum length sequences.

36. The method of claim 26 wherein the nested codes are PN-sequences.

37. The method according to claim 13 further comprising using a higher rate code correlator with the higher rate code to correlate the in-phase and quadrature components with the higher rate code to provide higher rate code correlator output; and
- sharing the higher rate code correlation output to feed two or more lower rate code correlators that each use a different one of the lower rate codes to provide the first and second lower rate code correlation results.

38. The method of claim 37 wherein N lower rate codes are selected from a set of M possible codes and the N lower rate codes are selected based on a priori system information.

\* \* \* \* \*